(12) United States Patent
O'Neill

(10) Patent No.: US 9,658,444 B2
(45) Date of Patent: May 23, 2017

(54) AUTOFOCUS SYSTEM AND AUTOFOCUS METHOD FOR FOCUSING ON A SURFACE

(71) Applicant: National Security Technologies, LLC, Las Vegas, NV (US)

(72) Inventor: Mary Morabito O'Neill, Santa Barbara, CA (US)

(73) Assignee: National Security Technologies, LLC, Las Vegas, NV (US)

( * ) Notice: Subject to any disclaimer, the term of this patent is extended or adjusted under 35 U.S.C. 154(b) by 179 days.

(21) Appl. No.: 14/539,962

(22) Filed: Nov. 12, 2014

(65) Prior Publication Data
US 2015/0168705 A1    Jun. 18, 2015

Related U.S. Application Data

(60) Provisional application No. 61/917,889, filed on Dec. 18, 2013.

(51) Int. Cl.
| | | |
|---|---|---|
| G02B 21/00 | (2006.01) | |
| G02B 21/36 | (2006.01) | |
| H04N 5/232 | (2006.01) | |

(52) U.S. Cl.
CPC ....... *G02B 21/367* (2013.01); *H04N 5/23212* (2013.01)

(58) Field of Classification Search
CPC .......................... G02B 21/367; H04N 5/23212
USPC .......................................................... 348/80
See application file for complete search history.

(56) References Cited

U.S. PATENT DOCUMENTS

| | | | |
|---|---|---|---|
| 5,995,143 A | 11/1999 | Price et al. | |
| 7,227,627 B1* | 6/2007 | Bussard | G01B 11/26 356/139.01 |
| 8,254,774 B2 | 8/2012 | Tsai et al. | |
| 2007/0016373 A1* | 1/2007 | Hunter | G01N 15/1475 702/19 |
| 2007/0122143 A1* | 5/2007 | Okamoto | G02B 21/244 396/432 |
| 2011/0228070 A1* | 9/2011 | Mehanian | H04N 5/23248 348/79 |

(Continued)

OTHER PUBLICATIONS

Vaquero, et al., "Generalized Autofocus", 2011 IEEE Workshop on Applications of Computer Vision (WACV), IEEE, 8 pages, Jan. 5, 2011.

(Continued)

*Primary Examiner* — Jeffery Williams
(74) *Attorney, Agent, or Firm* — Weide & Miller, Ltd.

(57) ABSTRACT

An autofocus system includes an imaging device, a lens system and a focus control actuator that is configured to change a focus position of the imaging device in relation to a stage. The electronic control unit is configured to control the focus control actuator to a plurality of predetermined focus positions, and activate the imaging device to obtain an image at predetermined positions and then apply a spatial filter to the obtained images. This generates a filtered image for the obtained images. The control unit determines a focus score for the filtered images such that the focus score corresponds to a degree of focus in the obtained images. The control unit identifies a best focus position by comparing the focus score of the filtered images, and controls the focus control actuator to the best focus position corresponding to the highest focus score.

18 Claims, 9 Drawing Sheets

(56) References Cited

U.S. PATENT DOCUMENTS

| | | | | |
|---|---|---|---|---|
| 2012/0194729 A1* | 8/2012 | Zahniser | ............. | G02B 21/244 |
| | | | | 348/345 |
| 2013/0100272 A1* | 4/2013 | Price | ................ | G02B 7/38 |
| | | | | 348/79 |
| 2013/0229531 A1* | 9/2013 | Zhang | ............... | H04N 17/002 |
| | | | | 348/187 |
| 2014/0362275 A1* | 12/2014 | Brunner | ............ | H04N 5/23212 |
| | | | | 348/349 |
| 2015/0055863 A1* | 2/2015 | Uchihara | ............ | H04N 1/4092 |
| | | | | 382/167 |

OTHER PUBLICATIONS

Mario A. Bueno-Ibarra, et al, "Fast autofocus algorithm for automated microscopes", Optical Engineering 44(6), 063601 (Jun. 2005), Jun. 20, 2005, 8 pages.

Shruti Bajaj, et al., Ultra-Rare-Event Detection Performance of a Custom Scanning Cytometer on a Model Preparation of Fetal nRBCs, © 2000 Wiley-Liss, Inc., Cytometry 39:285-294 (2000), 10 pages.

"Motion X Laser Auto Focus System", Motion X Corporation, www.motionx.org, 2 pages, date unknown.

* cited by examiner

AUTOFOCUS SYSTEM AND AUTOFOCUS METHOD FOR FOCUSING ON A SURFACE

CROSS REFERENCE TO RELATED APPLICATIONS

This application claims the benefit under 35 U.S.C. §119(e) to U.S. Provisional Application No. 61/917,889 filed Dec. 18, 2013, the contents of which are hereby incorporated by reference.

STATEMENT REGARDING FEDERAL RIGHTS

This invention was made with government support under Contract No. DE-AC52-06NA25946 and was awarded by the U.S. Department of Energy, National Nuclear Security Administration. The government has certain rights in the invention.

BACKGROUND

1. Field of the Invention

The disclosed embodiments relate to autofocus devices and in particular to autofocus systems and methods of focusing microscope optics on a surface of a sample. The autofocus method described here uses an autofocus score related to the best focus on the surface of a sample.

2. Related Art

Autofocus methods are implemented to focus cameras including cameras imaging through a microscope objective. There are a variety of methods of autofocus including measuring distance via sound, laser or image processing. Typical autofocus systems are configured to find the best focus on an object of interest in an image via a focus score or figure of merit. Autofocus typically scores sharpness of an image by looking for regions of great contrast. Typical focus scores ignore noise. For example, such autofocus systems find features, such as horizontal lines, of a prominent object in order to focus on the object. However, when a transparent sample being viewed by a microscope has very small multiple objects of interest on or near the surface of the sample while having other larger objects (such as labels and/or scratches) that are spatially larger and are substantially above or below the surface, the best focus is often ambiguous or incorrect to existing autofocus techniques. In such instances, conventional autofocus techniques may create a bimodal focus score resulting in the multiple objects of interest on or near the surface being out of focus. Because of the difficulty of conventional autofocus technologies to focus on a surface of a sample, new autofocus systems and techniques are desired.

SUMMARY

The disclosed embodiments were developed in light of the above described problems and aspect of the invention may include a microscope autofocus system comprising a microscope having a stage on which a sample is examined, an objective lens through which the sample is viewed, a stage actuator that actuates a stage along at least the Z (focus) axis, and an imaging device that is configured to image the sample, and an electronic control unit including a processor and control logic.

The electronic control unit may be configured to control the stage actuator to actuate the stage to a plurality of predetermined positions along a stage range of motion; obtain an image from the imaging device at each of the predetermined positions; apply a spatial filter to each of the obtained images thereby generating a filtered image for each of the obtained images; determine a focus score for each of the filtered images, the focus score of the filtered images corresponding to a degree of focus in the obtained images; identify a best focus position by comparing the focus score of each of the filtered images; and control the stage actuator to actuate the stage to the best focus position.

In the microscope autofocus system disclosed herein, the spatial filter may be two one-dimensional (1D) spatial filters that are applied to rows and columns of pixels in each of the obtained images. Two implementation of this filter exist. The first is a very computationally fast method of two one dimensional filters where the filter is first applied to the row or column, and then the 1D filtered data is filtered in the other dimension. For example, the very fast method would first apply the 1D filter below to the rows of an image $$I_{row}(c, r) = \frac{-I(c-k, r)}{2} + I(c, r) - \frac{I(c+k, r)}{2}$$

and the one dimension spatial filter applied to the columns of the row filtered image is $$I_{filt}(c, r) = \frac{-I_{rows}(c, r-k)}{2} + I_{rows}(c, r) - \frac{I_{rows}(c, r+k)}{2}$$

where k corresponds to a filter size and I corresponds to a pixel intensity in digital number (dn) from the imaging device, r is the row number and c is the column number in the image. For this microscope autofocus system, the best focus position may be further identified from comparing the focus score of each of the filtered images by estimating a peak focus score. The focus score for each position may be estimated based on a standard deviation of the of all the non-zero values of $y_{filt}$ of the filtered image. The best focus is found by finding the peak focus of the compared focus scores of each of the filtered images.

In another embodiment that is slower, but more accurate, the one dimensional (1D) spatial filter applied to the rows on the original image is $$I_{row}(c, r) = \frac{-I(c+k, r)}{2} + I(c, r) - \frac{I(c-k, r)}{2}$$

$$M_{row}(m, n) = \begin{cases} 1, & I_{row}(m, n) > I_{thresh} \text{ and } I_{row}(c+k, n) < \frac{-I_{thresh}}{2} \\ & \text{and } I_{row}(m-k, n) < \frac{-I_{thresh}}{2} \\ 0, & \text{Otherwise} \end{cases},$$

and the 1D spatial filter applied to the rows on the original image is $$I_{col}(c, r) = \frac{-I(c, r+k)}{2} + I(c, r) - \frac{I(c, r-k)}{2}$$

$$M_{col}(m, n) = \begin{cases} 1, & I_{col}(m, n) > I_{thresh} \text{ and } I_{col}(c, r+k) < \frac{-I_{thresh}}{2} \\ & \text{and } I_{col}(c, r-k) < \frac{-I_{thresh}}{2} \text{ and } I_{col}(c, r) \\ 0, & \text{Otherwise} \end{cases}$$

The image mask M(c, r) is then the Boolean and of the two separate filter, $$M(c,r)=M_{col}(c,r)\&M_{row}(c,r),$$

where r is the row, c is the column, and k corresponds to a filter size and I corresponds to a pixel intensity.

In this embodiment, the peak focus score is estimated by summing all the values in the M matrix which results in the number of pixels that made it through the spatial filter. The best focus is found by finding the peak focus of the compared focus scores of each of the filtered images. That is, the filtered image with the highest focus score among the compared images corresponds to the best focus.

According to additional aspects of the invention, an autofocus system may comprise an imaging device; a focus control actuator that is configured to change a focus position of the imaging device; and an electronic control unit including a processor and control log. The electronic control unit may be configured to control the focus control actuator to a plurality of predetermined focus positions; obtain an image from the imaging device at each of the predetermined positions; apply a spatial filter to each of the obtained images thereby generating a filtered image for each of the obtained images; determine a focus score for each of the filtered images, the focus score of the filtered images corresponding to a degree of focus in the obtained images; identify a best focus position by comparing the focus score of each of the filtered images; and control the focus control actuator to the best focus position.

In the above autofocus system the spatial filter may be two 1D spatial filters that are applied to rows and columns of pixels in each of the obtained images. Two implementations of this filter exist. The first is a very computationally fast method of two 1D filters where the filter is first applied to the row or column, and then the 1D filtered data is filtered in the other dimension. For example, the very fast method would first applied the filter below to the rows of an image $$I_{row}(c, r) = \frac{-I(c-k, r)}{2} + I(c, r) - \frac{I(c+k, r)}{2}$$

and the one dimension spatial filter applied to the columns of the row filtered image is $$I_{filt}(c, r) = \frac{-I_{rows}(c, r-k)}{2} + I_{rows}(c, r) - \frac{I_{rows}(c, r+k)}{2}$$

where k corresponds to a filter size and I corresponds to a pixel intensity in digital number (dn) from the imaging device, r is the row number and c is the column number in the image.

As is done in other autofocus methods, for this microscope autofocus system, the best focus position may be further identified from comparing the focus score of each of the filtered images to estimate a peak focus score. The focus score for each position may be estimated based on a standard deviation of the of all the non-zero values of $y_{filt}$, the filtered image. The best focus is found by finding the peak focus of the compared focus scores of each of the filtered images.

In another embodiment that is slower, but more accurate, the one dimension spatial filter applied to the columns on the original image is $$I_{row}(c, r) = \frac{-I(c+k, r)}{2} + I(c, r) - \frac{I(c-k, r)}{2}$$

$$M_{row}(m, n) = \begin{cases} 1, & I_{row}(m, n) > I_{thresh} \text{ and } I_{row}(c+k, n) < \frac{-I_{thresh}}{2} \\ & \text{and } I_{row}(m-k, n) < \frac{-I_{thresh}}{2} \\ 0, & \text{Otherwise} \end{cases}$$

and the 1D spatial filter applied to the rows on the original image is $$I_{col}(c, r) = \frac{-I(c, r+k)}{2} + I(c, r) - \frac{I(c, r-k)}{2}$$

$$M_{col}(m, n) = \begin{cases} 1, & I_{col}(m, n) > I_{thresh} \text{ and } I_{col}(c, r+k) < \frac{-I_{thresh}}{2} \\ & \text{and } I_{col}(c, r-k) < \frac{-I_{thresh}}{2} \text{ and } I_{col}(c, r) \\ 0, & \text{Otherwise} \end{cases}$$

The image mask M(c,r) is then the Boolean and of the two separate filter, $M(c, r)=M_{col}(c,r)\&M_{row}(c,r)$, where r is the row, c is the column, and k corresponds to a filter size and I corresponds to a pixel intensity.

In this embodiment, the peak focus score is estimated by summing all the values in the M matrix which results in the number of pixels that made it through the spatial filter. The best focus is found by finding the peak focus of the compared focus scores of each of the filtered images. That is, the filtered image with the highest focus score among the compared images corresponds to the best focus.

According to further aspects of the invention, there is an autofocus method for a microscope having a stage on which a sample is examined, an objective lens through which the sample is viewed, a stage actuator that actuates a stage along at least one axis, an imaging device that is configured to image the sample, and an electronic control unit including a processor and control logic. In this embodiment, the method includes the steps of controlling the stage actuator to actuate the stage to a plurality of predetermined positions along a stage range of motion. Then, obtaining an image from the imaging device at each of the predetermined positions. To one or more of the images, the operation applies a spatial filter to the obtained images, such as the image data thereby generating a filtered image data for each of the obtained images. The method of operation also determines a focus score for each of the filtered images such that the focus score of the filtered images corresponds to a degree of focus in the obtained images, which is represented by image data. Each image data may represent a set if data that cumulatively represents the image. Then the method analyzes and identifies a best focus position by comparing the focus score of each of the filtered images. To achieve the ideal focus and acquire one or more images, the method controls the stage actuator to move the stage to the best focus position. In one embodiment, a filter size of the spatial filter is the number of pixels that correspond to the largest object expected as a surface defect. In other embodiments, the filter size may vary with the size of the objects of interest.

Other systems, methods, features and advantages of the invention will be or will become apparent to one with skill in the art upon examination of the following figures and detailed description. It is intended that all such additional systems, methods, features and advantages be included

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF EMBODIMENTS

Figure 1:
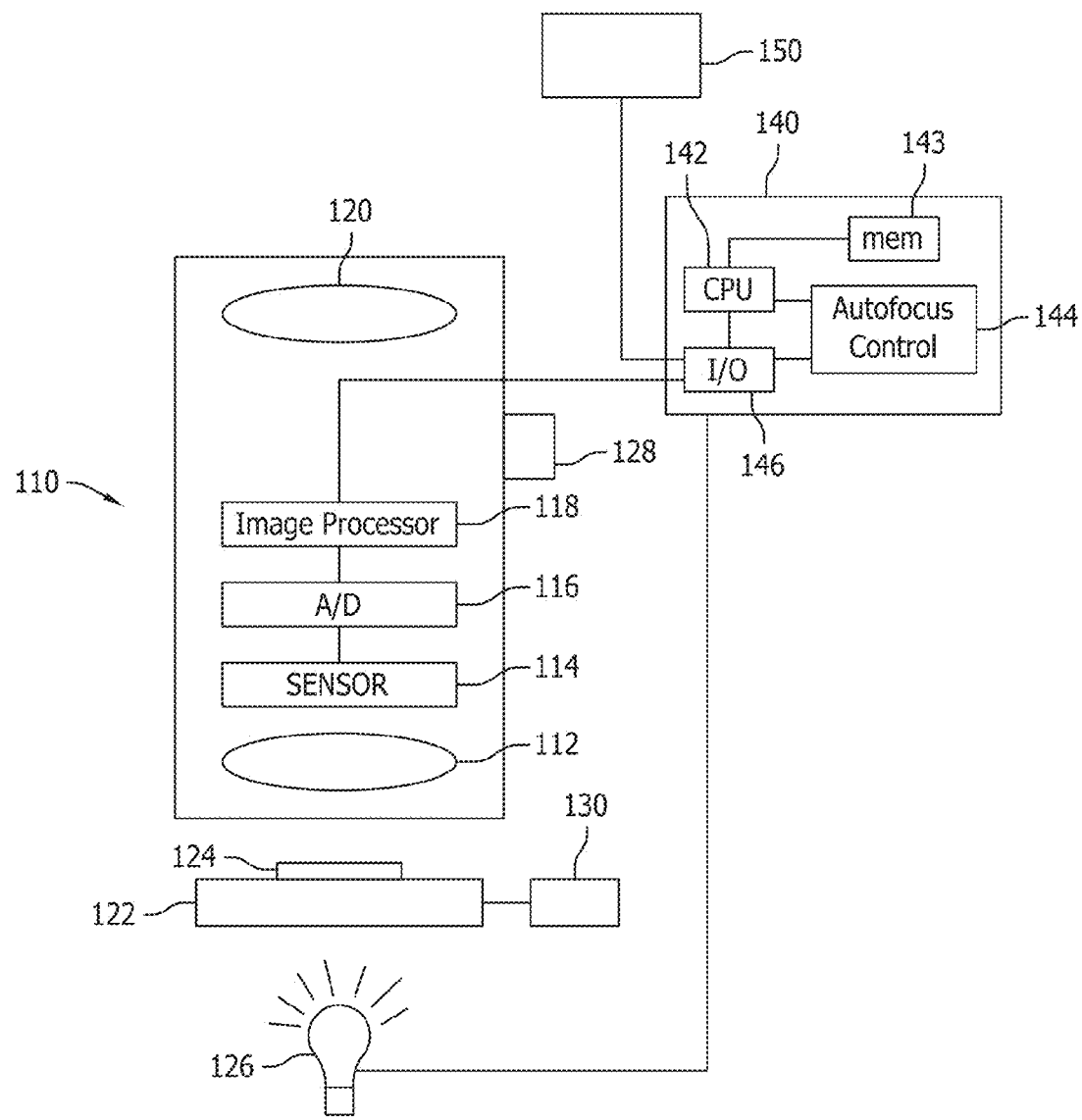
FIG. 1 shows a schematic representation of a microscope with an autofocus system according to one embodiment.

A microscope autofocus system and autofocus method for focusing on a surface is disclosed herein. FIG. 1 shows a schematic representation of a microscope with an autofocus system according to one embodiment. A microscope 110 may be an optical microscope having a lens system including an objective lens 112. The objective lens 112 focuses light onto an image sensor 114. The sensor may be, for example, a CCD or a CMOS sensor or any other device capable of capturing an image or video or presenting an image or video to a user. The term image is defined to be a still image or a video image and the image, after capture may be represented by a set of data, such as an image data set. Multiple images are represented by different image data sets.

The sensor 114 may be connected to an A/D converter 116, or may include an A/D converter. The digital signal from the A/D converter is presented to an image processor 118, which outputs image data to an electronic control unit (ECU) 140, described later. The image sensor 114, A/D converter 116, and image processor 118 may constitute an imaging device as described herein. The ECU 140 may comprise a processor. Memory 143 may also be part of this embodiment as either a stand-alone element or as part of the central processing unit (CPU) 142.

The microscope 110 may further include an eyepiece lens 120 through which a sample 124 may be viewed by a user. The microscope further includes a stage 122 on which the sample 124 may be placed for viewing. An illumination device 126 may be disposed below the stage 122 to illuminate the sample 124 from below the sample. The microscope may also include a manual focus mechanism 128 that is configured to raise and lower the stage 122 so as to position the sample 124 within a focal point of the objective lens 112. Alternatively, the manual focus mechanism 128 may raise and lower the objective lens 112 so as to raise and lower the focal point of the objective lens 112 with respect to the sample 124.

The microscope 110 may also include a stage actuator 130. The stage actuator 130 includes at least one actuator that is configured to independently move the stage in three dimensions, such as the X direction, Y direction and Z direction. That is, the stage actuator 130 may move the stage in two directions horizontally, and may move the stage up and down. As will be described below, an autofocus system may utilize the stage actuator 130 to focus the microscope 110. The stage actuator 130 may include one or more of any suitable actuator including hydraulic actuators, pneumatic actuators, electric actuators, and mechanical actuators, stepper motors, or any other device configured to effect motion of the stage 122 or sample 124. The actuator is configured to accurately move the stage as required to focus the microscope. For example, the actuator may have a resolution of 0.1 μm. While in this embodiment, the microscope 110 comprises a stage actuator 130, the microscope 110 could instead comprise on objective actuators for moving the objective lens 112 relative to the sample 124.

The microscope 110 is connected to an Electronic Control Unit ("ECU") 140. The ECU 140 includes a CPU 142, memory 143, and a plurality of inputs and outputs ("I/O unit") 146. The ECU 140 further incorporates an autofocus controller 144. The autofocus controller 144 is configured to determine a correct position for the stage 122 (or objective 112) such that the sample 124 may be brought into focus at a desired focal plane to capture the plane of interest in the sample. The autofocus controller 144 may be part of or replaced by the CPU 142 executing machine executable code (software). The memory 143 may be configured with machine readable code or machine executable instructions, also collectively referred to as software, configured to execute on the CPU 142. The machine executable instructions may be configured to process the image data as described below to create focus data, and then analyze the focus data to determine the correct focus position. The ECU 140 may be connected to one or more peripherals such as a display 150 and a user interface (not shown). An image obtained by the microscope 110 may be displayed via the ECU 140 on the display 150.

During use, the autofocus controller 144 instructs the stage actuator 130 to move the stage 122 to determine an optimal focus on the sample 124. When the optimal focus is determined the autofocus controller 144 instructs the stage actuator 130 to move the stage 122 into the focused position. Additional imaging (including capture of image data) may occur after the optimal focus position is determined, such as just above and just below the calculated optimal focus position to capture one or more image planes one either side of the calculated optimal focus position.

Figure 2:
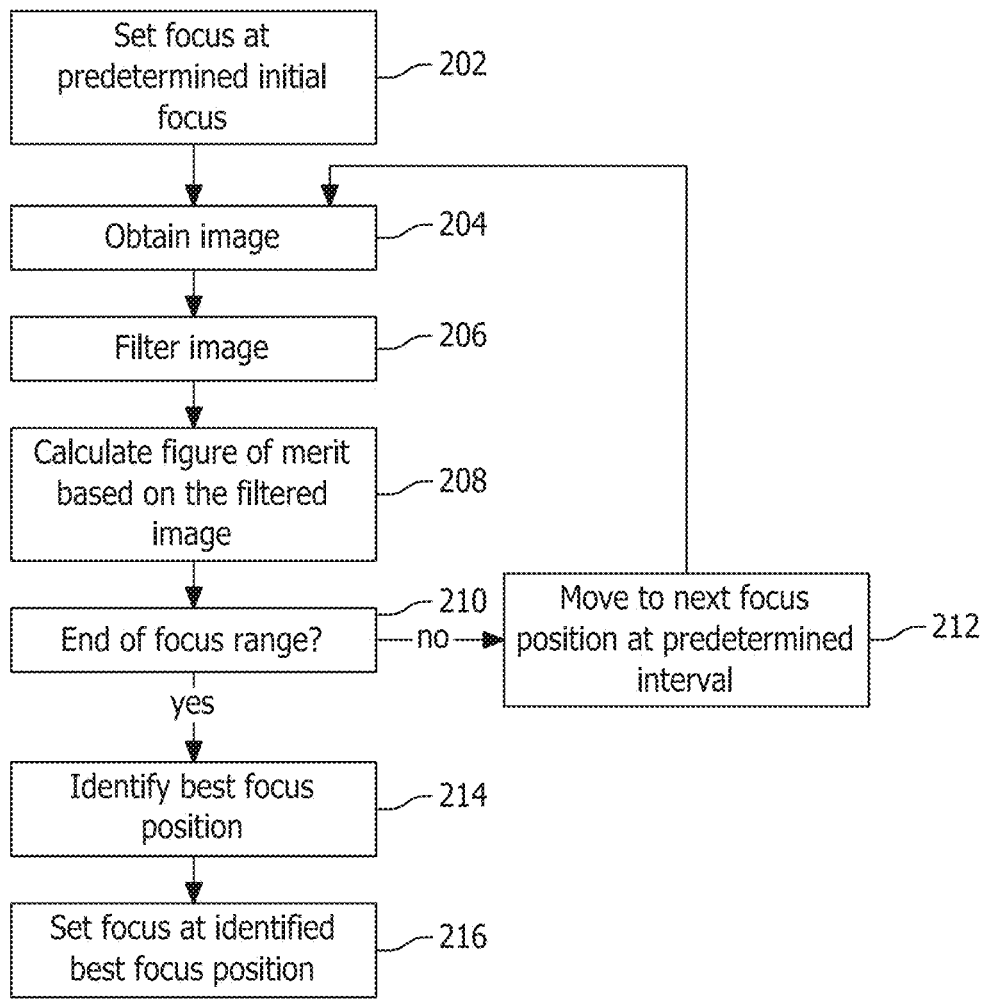
FIG. 2 shows a process autofocusing the microscope of FIG. 1 according to one embodiment.

FIG. 2 illustrates an exemplary process for autofocusing the microscope of FIG. 1 according. This is but one possible embodiment and method and other methods or steps may be added or removed without departing from the claims that follow. This method generates an estimate of the focal plane of focus. As described below, this process may be performed one or more times with different levels of focal plane resolution to generally locate the focal plane during a first iteration and then more accurately locate the focal plane during subsequent steps.

In step 202, the ECU 140 instructs the stage actuator 130 to position the stage at a predetermined initial focusing position. For example, the stage actuator 130 may position the stage 130 at one end of the stage's range of motion in the z-axis direction, such that it is known that the initial position is beyond or closer than the desired focal distance. As part of this step, the sample may be optionally backlit. The sample may be located on or part of a clear or translucent slide In step 204, the microscope 110 creates an image of the sample at the stage's current position. The image taken by the microscope is sent to the ECU. It is contemplated that the image is represented by digital data.

In step 206, the ECU applies a filter to the digital data representing the image (hereinafter image). In this embodiment, a spatial filter is applied to detect surface defects or other surface details that are spatially small, and are smaller than a predetermined number of pixels (or predefined element size) in the image. The spatial filter is thus set based on the pixel pitch of the images or other unit size if pixels are not referenced or used. Here, for efficiency and memory minimization two 1D spatial filters are applied instead of a 2D spatial filter. For a spatial filter size of 2k+1 pixels where k corresponds to a filter size and I corresponds to a pixel intensity in digital number (dn) from the imaging device, r is the row number and c is the column number in the image.

$$I_{row}(c, r) = \frac{-I(c-k, r)}{2} + I(c, r) - \frac{I(c+k, r)}{2}$$

The equation for the column filter that is applied at row m and column n of the row-filtered image is:

$$I_{filt}(c, r) = \frac{-I_{rows}(c, r-k)}{2} + I_{rows}(c, r) - \frac{I_{rows}(c, r+k)}{2}$$

After the ECU has applied the filter to the obtained image, a figure of merit focus score (also referred to herein as figure of merit (in the drawings) or focus score) is calculated based on the filtered image. This occurs in step 208. Here, the focus score may be the sum of active pixels remaining in the filtered image. That is, the focus score may be the number of pixels that pass through the filter with values or intensities above a given threshold. Alternatively, the focus score may be the sum of the value of the intensity of the pixels remaining in the filtered image. Alternatively, the focus score may be the standard deviation of all non-zero intensity values that pass through the filter. The ECU stores the focus score calculated at the current stage position in a memory and associates it with the stage position which generated the focus scores. The process then advances to a step 210.

In step 210, the ECU determines whether or not the stage is at the end of its range of motion. For example, the ECU determines whether the stage is at the other end of its range of motion, either physical or programmed, from the starting position in step 202. If the stage is not at the other end of its range of motion, then the process proceeds to step 212.

In step 212, the ECU instructs the stage actuator to move the stage to the next focus position at a predetermined interval. For example, the ECU may instruct the stage actuator to move the stage at a resolution of 4 μm. In other embodiment other resolution distance may be established such that the process ranges in on an approximate focal distance based on the depth of focus of the optical system and then fine tunes that focal distance. The process then repeats from step 204.

If at step 210 the ECU determines that the stage is at the other end of its range of motion, the process then advances to step 214. In step 214, the ECU identifies the best focus position by comparing the stored focus scores from each focus position in which an image was obtained. For example, the ECU may identify the position at which the highest focus score is achieved and select that position as the best focus position for that iteration. Subsequent iterations may then occur.

It is noted that the best focus position may well be at a position that is between two of the positions at which the stage was located during image capture during the process described above. The best focus position may be determined by using the weighted average of the positions with focus scores near the peak focus value. For all focus points that make it through this test, the weighted average is computed as $$Z_{best} = \frac{\sum_i Z_i \cdot f_i}{\sum_i f_i}$$

where $f_i$ is the focus score for image i, and $Z_i$ is the stage Z-position for image i.

Alternatively, the ECU may identify a range of positions in which the peak focus score occurs and set a new range of motion and predetermined interval for the process shown in FIG. 2. That is, the process shown in FIG. 2 may be repeated for a limited range of motion and a higher resolution based on the results of the first pass through the process. For Example, the ECU 140 may set of range of motion of 12 μm around the peak focus score and move the stage 122 at an interval of 0.5 μm to obtain the images. In this manner, a more accurate focus position may be determined.

In step 216, once the best focus position has been identified, the ECU 140 instructs the stage actuator 130 to move the stage 122 to the focus position. From this stage position identified to be the best stage position to yield the elements of interest in the sample in focus, additional images may be captured.

Figure 3:
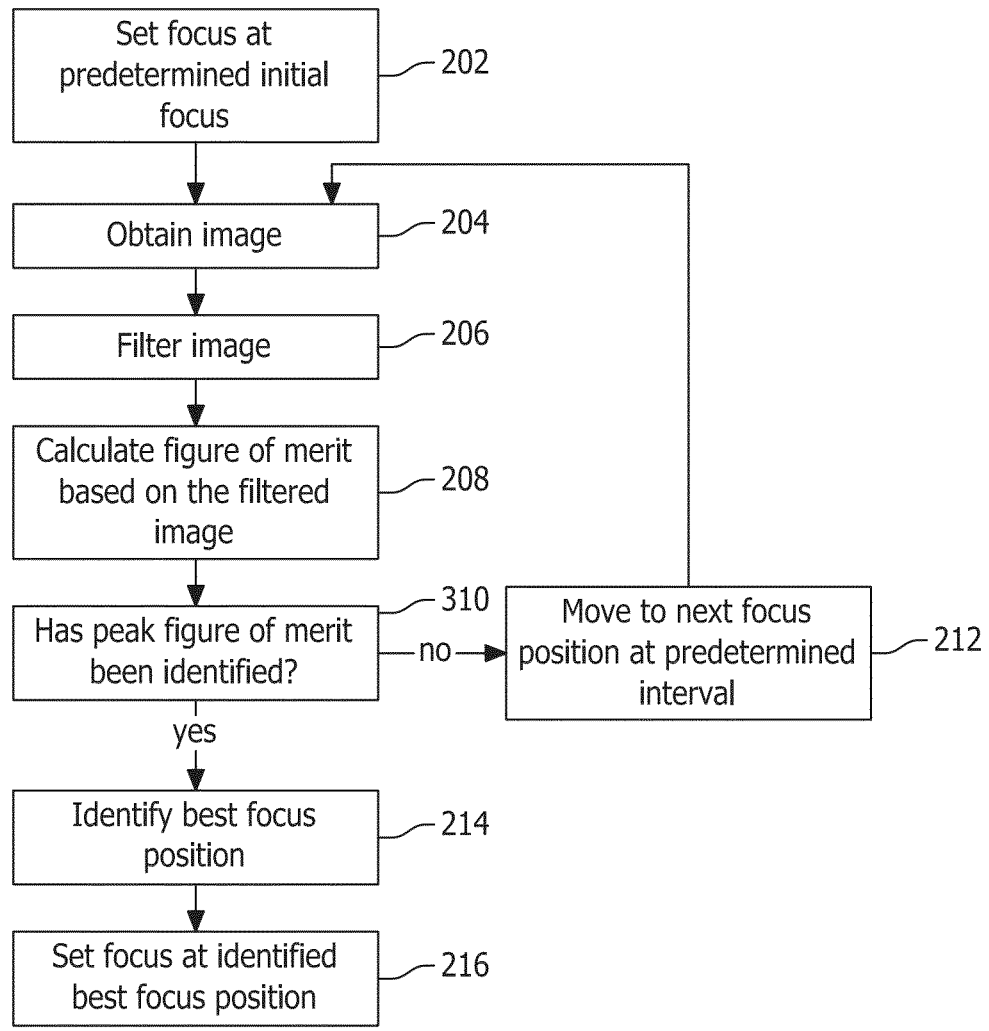
FIG. 3 shows a process autofocusing the microscope of FIG. 1 according to one embodiment.

FIG. 3 shows a process autofocusing the microscope of FIG. 1 according to one embodiment. The process shown in FIG. 3 includes similar steps to that of FIG. 2, and a description of the similar process steps will be omitted. After step 208 in FIG. 3, once the ECU has calculated the focus score based on the filtered image, the process proceeds to step 310. In step 310, instead of determining whether the stage has reached the end of its focus range, the ECU determines if the peak focus score has been identified.

For example, the ECU compares the focus score from each filtered image as images are captured and filtered throughout the stage's range of focus. The ECU can thus track the focus score in real time. In this manner, the ECU may identify the peak focus score, from among several stage positions, before the stage actuator moves the stage through the entire range of motion. The ECU may be configured to identify that the peak focus score has been achieved when the focus score in successive filtered images decreases by at least 20% from a peak focus score. In another embodiment, this percent decrease may be another value based on the characteristics of the depth of field of the microscope system and the chosen focus step. When the peak focus score is identified, the process proceeds to step 214, which is described in detail above.

Figure 6A:
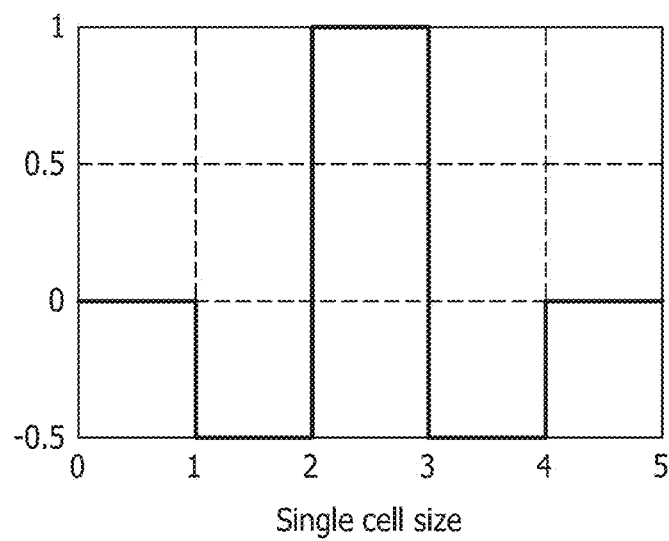
FIG. 6A shows a representation of a 1D spatial filter.
Figure 6B:
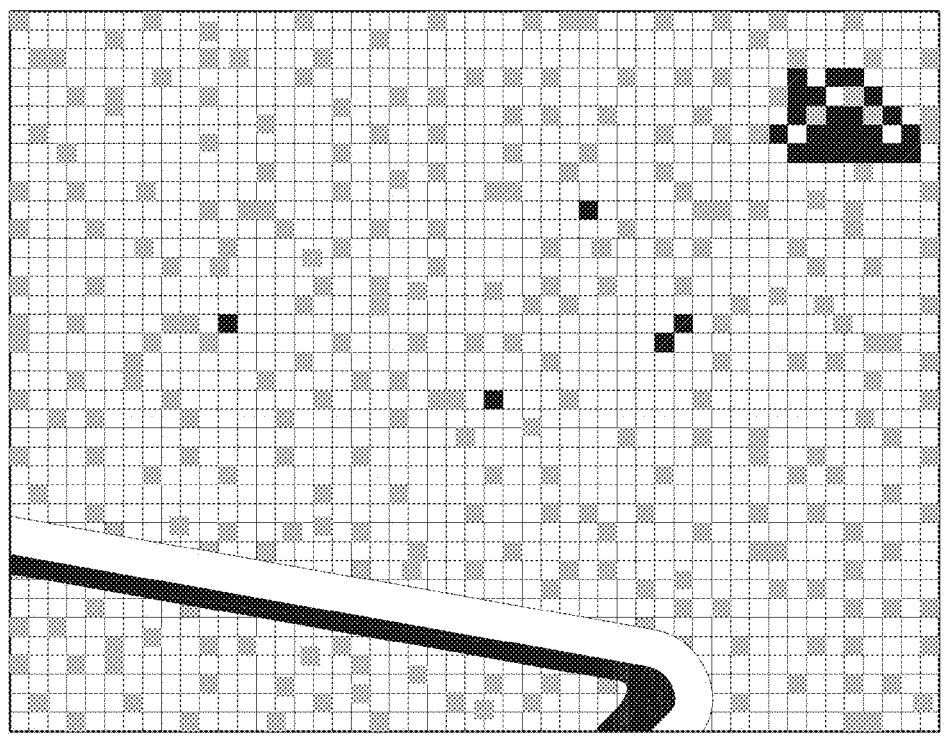
FIG. 6B shows an example of image before the spatial filter of FIG. 6A is applied.
Figure 6C:
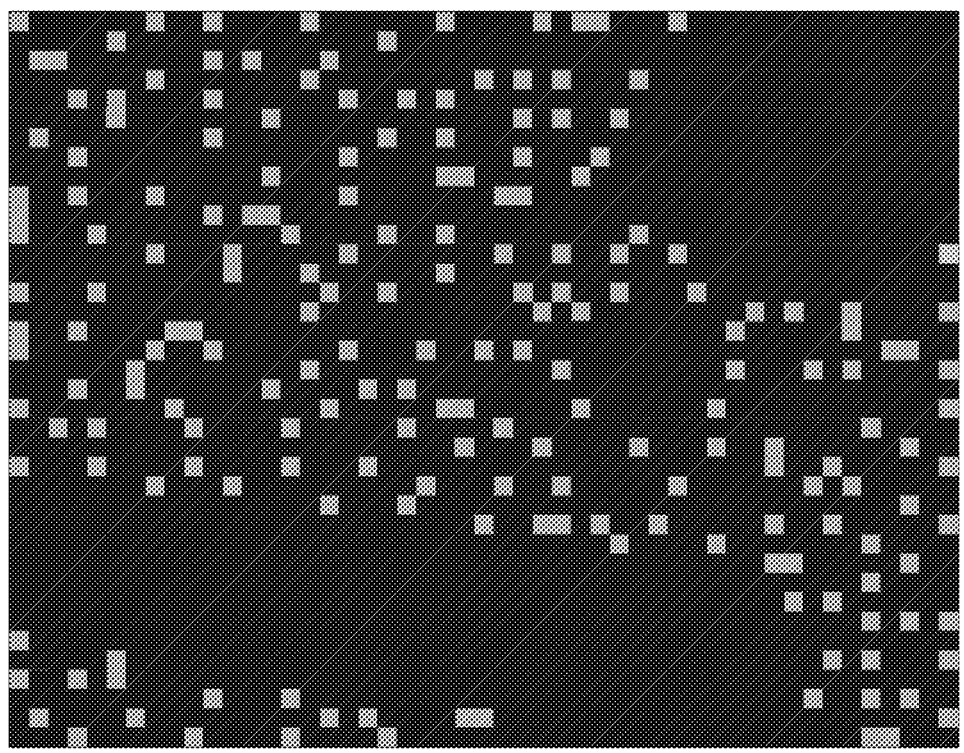
FIG. 6C shows an example of an image after the spatial filter of FIG. 6A is applied.

The above described process can be graphically represented as shown in FIGS. 6A-6C. FIG. 6A shows a representation of a 1-D spatial filter, FIG. 6B shows an example of image before the spatial filter of FIG. 6A is applied, and FIG. 6C shows an example of an image after the spatial filter of FIG. 6A is applied. Each of FIGS. 6A, 6B, and 6C is discussed below in greater detail.

As shown in FIG. 6A, the spatial filter takes a value of the pixel or pixels upon which it is centered and subtracts half the value of the adjacent pixel or pixels. Such a spatial filter may be applied to an image or a portion of an image as shown in FIG. 6B. In FIG. 6B, a plurality of pixels at various pixel positions are represented symbolically. The result of the filter being applied allows only the pixels or elements shown in FIG. 6C to pass through the filter. As can be seen in FIG. 6C, pixels in areas where larger features in FIG. 6B exist do not pass through the filter, and areas where smaller features in FIG. 6B exist may pass through the filter. The focus score is thus determined from a filtered image such as the one shown in FIG. 6C. As explained above, the focus score may represent the number of pixels remaining in FIG. 6C that passed through the filter, or the sum of the intensity values of the remaining pixel in FIG. 6C.

With the above described autofocusing processes, the microscope 110 can consistently focus on a surface of the sample 124 to capture the aspects of the sample of interest. By applying a spatial filter to the image, both the edges of objects of interest (which are at the surface) and any surface mottling produce the optimum result making this method effective for all types of samples and illumination methods. In one environment, the method of focusing is used with backlit samples. The implemented filtering technique minimizes both memory and processing power making it as efficient as some of the most efficient autofocusing techniques that do not have the other advantages and features as the disclosed embodiments.

The above embodiments are not only efficient for optical microscopes, but may also be employed for APD (Avalanche photodiode detection) images. The above described autofocus techniques focus on the surface based on the assumption that the surface of the sample 124 has defects and objects of interest that are spatially small and/or located on the surface of the sample and not in depressions in the sample or not the depression itself. As a result, labels and deep scratches are not key features in this autofocus algorithm. Instead the algorithm relies on the spatially small surface defects that result from etching or other surface defects that are much less common inside a sample. Because images typically have millions of pixels, only a very small number of pixels need to provide data in order to get reasonable focus scores. This means larger, recognizable features in the image are not required and thus offers an improvement over the prior art techniques which require such recognizable features to determine an autofocus position.

Further, while the above autofocusing system and method has been described with reference to a microscope, the invention is not limited to this. The autofocus system could be applied to any imaging device such as a digital camera or imaging machine vision by selecting a filter size that matches the spatial extent (geometric size or dimension) of objects of interest. In addition, by applying a minimum and maximum filter size, only objects of a given size will be allowed to contribute to the focus score. As will be appreciated, in a digital camera, instead of having a stage actuator 130 driving a stage 122 with respect to an objective lens 112, the autofocus system can be applied with an actuator or autofocus motor driving an autofocus lens or lens group.

Figure 4:
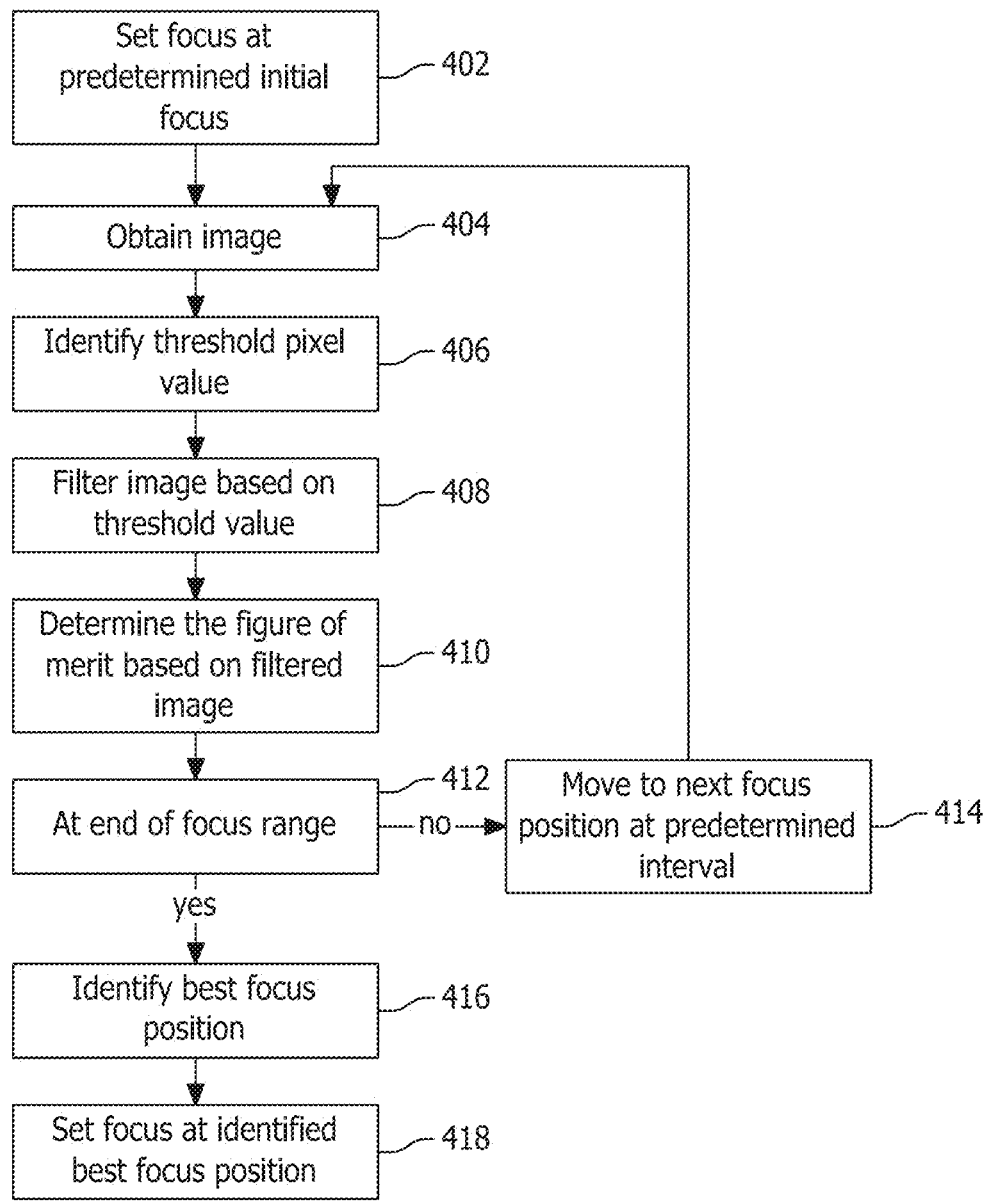
FIG. 4 shows a process autofocusing the microscope of FIG. 1 according to one embodiment.

FIG. 4 shows a process of autofocusing the microscope of FIG. 1 according to one embodiment. In step 402, the ECU instructs the stage actuator to position the stage at a predetermined initial focusing position. For example, the stage actuator may position the stage at one end of the stage's range of motion in the z-axis direction.

In step 404, the microscope and camera create an image (typically comprising digital data) of the sample at the stage's current position. The image taken by the microscope is sent to the ECU.

In step 406, a threshold value is identified for the pixels in the image which will be applied to the filter in step 408. Here, the threshold value $I_{thresh}$ is the standard deviation of all pixels in the obtained image with a value greater than zero. Once the threshold value is obtained, the process proceeds to step 408.

In step 408, the ECU 140 applies a filter to the image based on the threshold value. As before, this filter works under the assumption that the focus is on surface defects that are spatially small. Prior art focus techniques would miss or not focus on these features. In this embodiment, two 1D spatial filters having a size of k pixels are applied to the rows and columns of the obtained image. In other embodiments, a single 2D might be used but with an increase in processing complexity. A 1D spatial filter is first applied to all of the columns of the image as represented below:

$$I_{row}(c, r) = \frac{-I(c+k, r)}{2} + I(c, r) - \frac{I(c-k, r)}{2}$$

$$M_{row}(m, n) = \begin{cases} 1, & I_{row}(m, n) > I_{thresh} \text{ and } I_{row}(c+k, n) < \frac{-I_{thresh}}{2} \\ & \text{and } I_{row}(m-k, n) < \frac{-I_{thresh}}{2} \\ 0, & \text{Otherwise} \end{cases}$$

A 1D spatial filter is then applied to all of the rows of the image as represented below:

$$I_{col}(c, r) = \frac{-I(c, r+k)}{2} + I(c, r) - \frac{I(c, r-k)}{2}$$

$$M_{col}(m, n) = \begin{cases} 1, & I_{col}(m, n) > I_{thresh} \text{ and } I_{col}(c, r+k) < \frac{-I_{thresh}}{2} \\ & \text{and } I_{col}(c, r-k) < \frac{-I_{thresh}}{2} \text{ and } I_{col}(c, r) \\ 0, & \text{Otherwise} \end{cases}$$

The image mask M(c,r) is then the Boolean and of the two separate filter, $M(c, r) = M_{col}(c,r) \& M_{row}(c,r)$, where r is the row, c is the column, and k corresponds to a filter size and I corresponds to a pixel intensity.

The above spatial filters locate spatially small features in the image by determining if pixels in the filtered image have an intensity greater than the threshold value $I_{thresh}$. This is done by first applying the spatial filter represented in FIG. 6A to pixels of columns of the image, where the filter subtracts half of the value of adjacent filter areas from the area on which the filter is centered. Then, the filter determines whether the resulting filtered value exceeds the threshold $I_{thresh}$ and whether the adjacent filtered values are less than half of the threshold $I_{thresh}$. If the criteria are met, the filter assigns the position a "1," and if not, the filter assigns the position a "0." The results are stored in a matrix mask $M_{col}(m, n)$. A similar process is then conducted for rows of the image, except an additional criteria is added to check whether the filtered position was assigned in "1" in matrix $M_{col}(m, n)$. If all of the criteria are met, the filter assigns the position a "1," and if not, the filter assigns the position a "0." The results are stored in the matrix M(m, n). The filtered image mask is then created from the matrix M(m, n).

Once the spatial filter has been applied, the process proceeds to step 410. In step 410, the ECU determines the focus score based on the filtered image. In this instance, the focus score for an image is determined by adding up all of the ones (filter outputs for each filter position in during the processing of the image with the filter) from the matrix M(m, n) to determine the number of pixels that passed through the filter (meet the requirements to generate a filter output). The total number of pixels that pass through is the focus score.

In step 412, the ECU determines whether the stage has been moved through its entire programmed range of motion. For example, the ECU determines whether the stage is at the other end of its range of motion from the starting position in step 402. If the stage is not at the other end of its range of motion, then the process proceeds to step 414.

In step 414, the ECU instructs the stage actuator to move the stage to the next focus position at a predetermined interval. For example, the ECU may instruct the stage actuator to move the stage at a resolution such as 4 μm if the depth of focus of the system is on this order. Thus, each step moves the stage 4 μm. The process then returns to step 404 and the process repeats.

If at step 412 the ECU determines that the stage is at the other end of its range of motion, either physical or programmed, the process then proceeds to step 416. At step 416, the ECU identifies the best focus position by comparing the stored focus scores for each image generated at each focus position in which an image was obtained. For example, the ECU may identify the position at which the highest focus score is achieved and select that position as the best focus position for that iteration of the autofocus routing. Here, the ECU may identify the position having the highest number of ones (resulting in the highest overall focus score) in the matrix M.

It is noted that the best focus position may well be at a position that is between two of the positions checked during the process. The best focus position may be determined by using the weighted average of the positions with focus scores near the peak focus value. For all focus points that make it through this test, the weighted average is computed as $$Z_{best} = \frac{\sum_i Z_i \cdot f_i}{\sum_i f_i}$$

where $f_i$ is the focus score for image i, and $Z_i$ is the stage Z-position for image i. In this manner, the ECU may select the best focus position that is in between positions checked according to the predetermined interval in step 212.

Alternatively, the ECU may identify a range of positions in which the peak focus score occurs and set a new range of motion and predetermined interval for the process shown in FIG. 4. That is, the process shown in FIG. 4 may be repeated for a limited range of motion at a higher resolution based on the results of the first pass through the process. For Example, the ECU may next set of range of motion of 12 μm around the peak focus score and move the stage at an interval of 0.5 μm to obtain the images. In this manner, a more accurate focus position may be determined. In step 418, once the best focus position has been identified, the ECU instructs the stage actuator to move the stage to the focus position. From this position, additional routines may occur.

Figure 5:
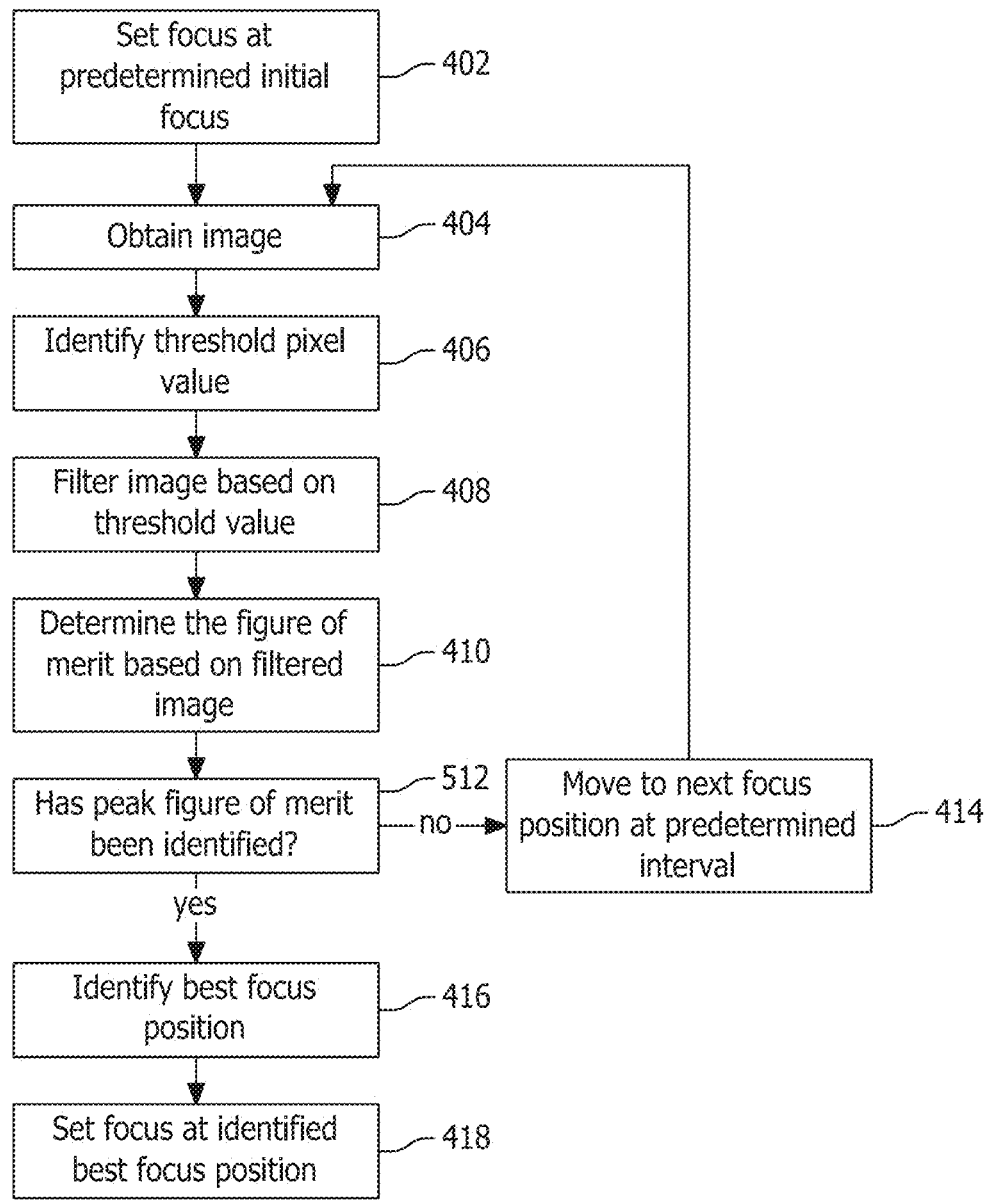
FIG. 5 shows a process autofocusing the microscope of FIG. 1 according to one embodiment.

FIG. 5 shows a process autofocusing the microscope of FIG. 1 according to one embodiment. The process shown in FIG. 5 includes similar steps to that of FIG. 4, and a description of the similar process steps will be omitted. In FIG. 5, once the ECU has calculated the focus score based on the filtered image in step 410, the process proceeds to step 512. In step 512, instead of determining whether the stage has reached the end of its focus range, the ECU determines if the peak focus score has been identified.

For example, the ECU compares the focus score from each filtered image as images are captured and filtered throughout the stage's range of focus. The ECU can thus track each focus score in real time. In this manner, the ECU may identify the peak focus score before the stage actuator moves the stage through the entire range of motion. In this embodiment, the ECU may be configured to identify that the peak focus score has been achieved when the focus score in successive filtered images decreases by an appropriate amount based on the sample settings, for example it may decrease by at least 20% from a peak focus score. When the peak focus score is identified, the process proceeds to step 416, which is described in detail above.

By using the above algorithm, the microscope may be consistently focused on a surface of the sample. The technique described in reference to FIGS. 4 and 5 provides the same described advantages as the technique described with reference to FIGS. 2 and 3. Further, the technique described in FIGS. 4 and 5 may be more tolerant of edge effects caused by larger objects that may be located on the sample.

Figure 7:
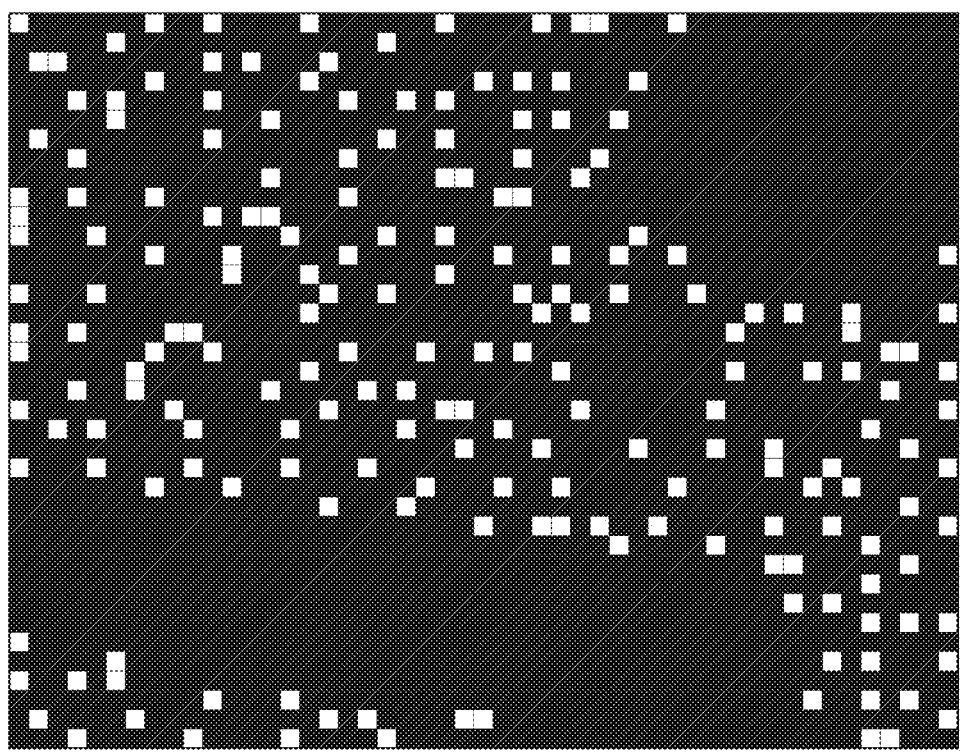
FIG. 7 shows an example filtered of according to an exemplary embodiment.

FIG. 7 shows an example filtered image achieved with the spatial filter described in FIGS. 4 and 5. FIG. 7 is an example of a filtered image when the above-described spatial filter is applied to the image shown in FIG. 6B. Here, the resulting filtered image has distinct pixels that pass through the filter (ones in the matrix M) that are used to calculate the focus score.

It is noted that in the above embodiment, the autofocusing techniques may be applied to only a portion (region of interest) of the image obtained by the microscope 110. In this manner, required processing and memory can be further reduced, and the speed of the autofocusing processing can be increased.

As explained above, the autofocusing processes can be repeated a desired number of times to more accurately determine the best autofocus position. That is, the process can be repeated for smaller ranges of motion at higher resolutions of focusing intervals.

EXAMPLES

This processing method and apparatus has been tested and shown to provide advantages over prior art systems. This algorithm is based on the discovery that the surface of the sample has defects and objects of interest that are spatially small. The algorithm relies on the spatially small surface defects that are much less common inside a sample. This means larger, recognizable features in the image are not required. For any sample with a natural surface roughness and objects near the surface, this is an ideal algorithm. The filter size can be set for the sample type and is specified in μm. Preliminary testing of the STL autofocus algorithm with typical system images indicates that this unique algorithm will provide a robust autofocus solution for microscope autofocus systems. Careful implementation of the autofocus sequence based on this analysis will guarantee focused images.

Figure 8A:
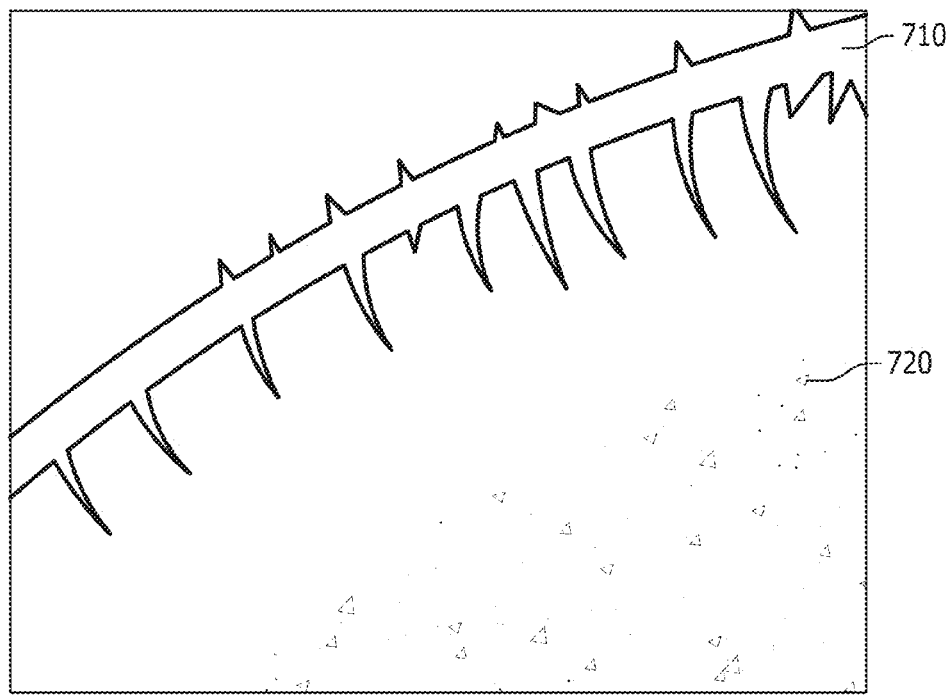
FIG. 8A shows an example image obtained using autofocusing according to conventional techniques.
Figure 8B:
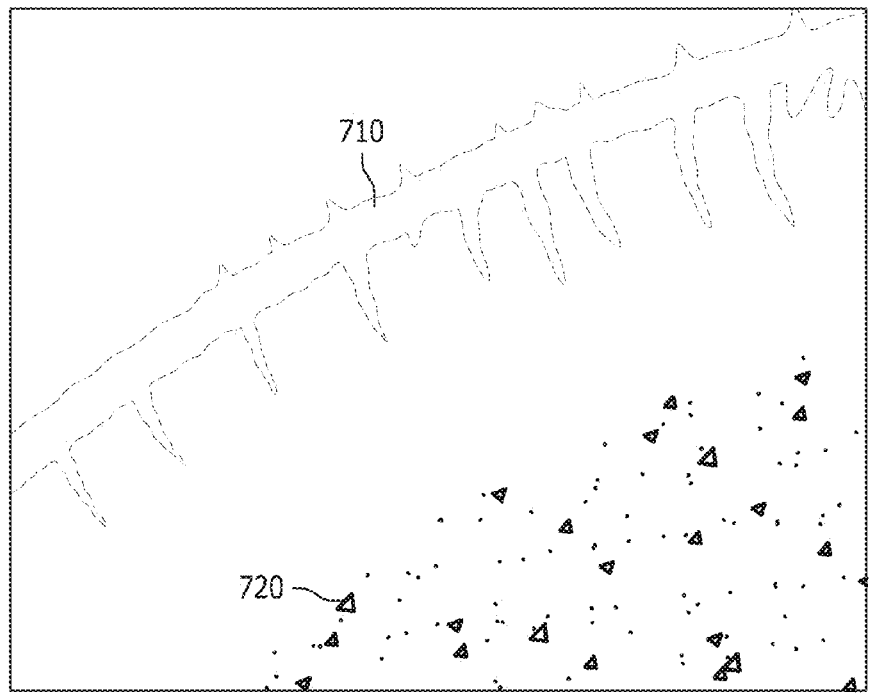
FIG. 8B shows an example image obtained using autofocusing according to the disclosed embodiments.

FIG. 8A shows an example image obtained using autofocusing according to the conventional techniques and FIG. 8B shows an example image obtained using autofocusing according to the disclosed embodiments. As shown in FIG. 8A, typical autofocus techniques focus in on the large feature in the image, resulting in the large gouge 710 being in focus, while the surface features 720 out of focus. This is represented in FIG. 8A by the gouge 710 being represented by solid lines, and the surface features 720 being represented with thinner dotted lines. In contrast, in FIG. 8B using the above described autofocusing techniques, the surface features 720 are in focus, while the large gouge is out of focus. This is represented by the gouge 710 being shown in a thin dotted line, and the surface features 720 being shown in solid lines. Thus, typical object based autofocus systems would fail to focus in on the surface as compared to the disclosed autofocus system described above.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A microscope autofocus system comprising:
    a microscope including;
    a stage configured to support a sample;
    a stage actuator configured to selectively move a stage along at least one axis;
    an imaging device configured to generate image data representing the sample; and
    an objective lens between the stage and the imaging device, the objective lens configured to direct an optical image of the sample to the imaging device; and
    an electronic control unit including a processor, the electronic control unit being configured to:
       generate a stage actuator control signal to move the stage to a plurality of predetermined positions along a stage range of motion;
       obtain image data sets representing an image of the sample from the imaging device, the image data sets associated with the predetermined stage positions;
       apply two 1D spatial size filters to rows and columns of pixels in the obtained images of the image data sets corresponding to the predetermined positions thereby generating a filtered image for each of the obtained images, such that the spatial size filter only allows objects of a size which meet a size criteria of the spatial size filters to remain in the filtered image;
       determine a focus score for each of the filtered images, the focus score of the filtered images corresponding to a degree of focus in the obtained images;
       identify a best focus position selected from the stage range of motion by comparing the focus score of each of the filtered images; and
       control the stage actuator to move the stage to the best focus position.

2. The microscope autofocus system according to claim 1, wherein the spatial filter is two 1D spatial filters that are applied to rows and columns of pixels in each of the obtained images.

3. The microscope autofocus system according to claim 1, wherein the 1D spatial filter applied to the rows is $$I_{row}(c, r) = \frac{-I(c-k, r)}{2} + I(c, r) - \frac{I(c+k, r)}{2}$$

and the one dimension spatial filter applied to the columns of the row filtered image is $$I_{filt}(c, r) = \frac{-I_{rows}(c, r-k)}{2} + I_{rows}(c, r) - \frac{I_{rows}(c, r+k)}{2}$$

where k corresponds to a filter size and I corresponds to a pixel intensity in digital number (dn) from the imaging device, r is the row number and c is the column number in the image.

4. The microscope autofocus system according to claim 2, wherein the one dimension spatial applied to the columns is $$I_{row}(c, r) = \frac{-I(c+k, r)}{2} + I(c, r) - \frac{I(c-k, r)}{2}$$

$$M_{row}(m, n) = \begin{cases} 1, & I_{row}(m, n) > I_{thresh} \text{ and } I_{row}(c+k, n) < \frac{-I_{thresh}}{2} \\ & \text{and } I_{row}(m-k, n) < \frac{-I_{thresh}}{2} \\ 0, & \text{Otherwise} \end{cases},$$

and the 1D spatial filter applied to the rows on the original image is $$I_{col}(c, r) = \frac{-I(c, r+k)}{2} + I(c, r) - \frac{I(c, r-k)}{2}$$

$$M_{col}(m, n) = \begin{cases} 1, & I_{col}(m, n) > I_{thresh} \text{ and } I_{col}(c, r+k) < \frac{-I_{thresh}}{2} \\ & \text{and } I_{col}(c, r-k) < \frac{-I_{thresh}}{2} \text{ and } I_{col}(c, r) \\ 0, & \text{Otherwise} \end{cases}$$

and the image mask M(c,r) is then the Boolean and of the two separate filter, M(c, r)=$M_{col}$(c,r)&$M_{row}$(c,r), where r is the row, c is the column, and k corresponds to a filter size and I corresponds to a pixel intensity.

5. The microscope autofocus system according to claim 1 wherein the best focus position is further identified by comparing the focus score of each of the filtered images to determine a peak focus score, such that the peak focus score identifies the best focus position.

6. The microscope autofocus system according to claim 5, wherein the peak focus score is estimated based a weighted average of positions with focus scores near the peak focus score.

7. The microscope autofocus system according to claim 6, wherein the peak focus score is estimated by obtaining a set of filtered images with fine Z step resolution at locations about an approximate best focus location and comparing focus scores from the set of filtered images.

8. An autofocus system comprising:
    an imaging device configured to create image data sets representing an image;
    a focus control actuator that is configured to change a focus position for the imaging device; and
    an electronic control unit including a processor and machine executable code, the electronic control unit being configured to adjust the focus control actuator to change the focus position a plurality of predetermined focus positions;

capture image data sets from the imaging device at two or more of the predetermined positions;

apply a spatial size filter to two or more of the image data sets thereby generating a filtered image for each of the image data sets to which the filter is applied, the spatial size filter processing the two or more image data sets based on a size of an object in an image data set;

determine a focus score for each of the filtered images, the focus score of the filtered images corresponding to a degree of focus in the captured images represented by image data sets;

identify a best focus position by comparing the focus score for two or more of the image data sets; and control the focus control actuator to establish the focus position at the best focus position.

9. The autofocus system according to claim 8, wherein the filter is two 1D spatial filters that are applied to rows and columns of pixels in one or more of each of the obtained images data sets.

10. The autofocus system according to claim 9, wherein the 1D spatial filter applied to the rows is $$I_{row}(c, r) = \frac{-I(c-k, r)}{2} + I(c, r) - \frac{I(c+k, r)}{2}$$

and the one dimension spatial filter applied to the columns of the row filtered image is $$I_{filt}(c, r) = \frac{-I_{rows}(c, r-k)}{2} + I_{rows}(c, r) - \frac{I_{rows}(c, r+k)}{2}$$

where k corresponds to a filter size and I corresponds to a pixel intensity in digital number (dn) from the imaging device, r is the row number and c is the column number in the image $$y(m, n) = \frac{-x(m-k, n)}{2} + x(m, n) - \frac{x(m+k, n)}{2}$$

$$y_{filt}(m, n) = \frac{-y(m, n-k)}{2} + y(m, n) - \frac{y(m, n+k)}{2}$$

11. The microscope autofocus system according to claim 9, wherein the one dimension spatial applied to the columns is $$I_{row}(c, r) = \frac{-I(c+k, r)}{2} + I(c, r) - \frac{I(c-k, r)}{2}$$

$$M_{row}(m, n) = \begin{cases} 1, & I_{row}(m, n) > I_{thresh} \text{ and } I_{row}(c+k, n) < \frac{-I_{thresh}}{2} \\ & \text{and } I_{row}(m-k, n) < \frac{-I_{thresh}}{2} \\ 0, & \text{Otherwise} \end{cases},$$

and the 1D spatial filter applied to the rows on the original image is $$I_{col}(c, r) = \frac{-I(c, r+k)}{2} + I(c, r) - \frac{I(c, r-k)}{2}$$

$$M_{col}(m, n) = \begin{cases} 1, & I_{col}(m, n) > I_{thresh} \text{ and } I_{col}(c, r+k) < \frac{-I_{thresh}}{2} \\ & \text{and } I_{col}(c, r-k) < \frac{-I_{thresh}}{2} \text{ and } I_{col}(c, r) \\ 0, & \text{Otherwise} \end{cases}$$

and the image mask M(c, r) is then the Boolean and of the two separate filter, $M(c, r) = M_{col}(c,r) \& M_{row}(c,r)$ where r is the row, c is the column, and k corresponds to a filter size and I corresponds to a pixel intensity.

12. The autofocus system of claim 8, wherein the filter is a spatial filter performed on digital data using machine readable code stored on a memory that is executed by the electronic control unit.

13. The autofocus system of claim 8, wherein the filter is a two dimensional filter.

14. An autofocus method for a microscope having a stage on which a sample is examined, an objective lens through which the sample is viewed, a stage actuator that actuates a stage along at least one axis, an imaging device that is configured to image the sample, and an electronic control unit including a processor and control logic, the method comprising:

controlling the stage actuator to actuate the stage to a plurality of predetermined positions along a stage range of motion;

obtaining an image from the imaging device at two or more of the predetermined positions to create two or more obtained images;

applying a spatial size filter to two or more of the obtained images thereby generating a filtered image data for the two or more obtained images, the filter image data filtered by the spatial size filter based on size of objects in the obtained images;

processing the filtered image data to determine which image has a highest degree of focus;

identifying a best focus position based on the processing; and controlling the stage actuator to move the stage to the best focus position.

15. The autofocus method according to claim 12, wherein a filter size variable of the spatial filter equation is 5 μm or less.

16. The microscope autofocus system according to claim 1, wherein the system is part of an digital camera, the filter size is matched to the spatial extent of objects of interest and the stage and stage actuator are replaced by an autofocus lens.

17. The autofocus system according to claim 8, wherein the system is part of a digital camera and the filter size is matched to the spatial extent of objects of interest.

18. The autofocus method according to claim 14, wherein the method is performed in a digital camera, the filter size is matched to the spatial extent of objects of interest, the stage and stage actuator are replaced by an autofocus lens, and the sample is an object of interest.

* * * * *